United States Patent
Whitworth et al.

(10) Patent No.: US 10,155,366 B2
(45) Date of Patent: Dec. 18, 2018

(54) SINGLE STAGE DEBULK AND CURE OF A PREPREG MATERIAL

(75) Inventors: Denver R. Whitworth, North Richland Hills, TX (US); Vance N. Cribb, Aledo, TX (US)

(73) Assignee: Textron Innovations Inc., Providence, RI (US)

( * ) Notice: Subject to any disclaimer, the term of this patent is extended or adjusted under 35 U.S.C. 154(b) by 178 days.

(21) Appl. No.: 13/696,944

(22) PCT Filed: Jan. 11, 2011

(86) PCT No.: PCT/US2011/020771
§ 371 (c)(1),
(2), (4) Date: Nov. 8, 2012

(87) PCT Pub. No.: WO2012/096650
PCT Pub. Date: Jul. 19, 2012

(65) Prior Publication Data
US 2013/0056131 A1    Mar. 7, 2013

(51) Int. Cl.
| | |
|---|---|
| *B32B 37/10* | (2006.01) |
| *B30B 5/02* | (2006.01) |
| *B29C 70/44* | (2006.01) |
| *B29C 37/00* | (2006.01) |
| *B29C 73/12* | (2006.01) |
| *B29C 73/10* | (2006.01) |

(52) U.S. Cl.
CPC ............ *B32B 37/10* (2013.01); *B29C 37/006* (2013.01); *B29C 70/44* (2013.01); *B29C 73/12* (2013.01); *B30B 5/02* (2013.01); *B29C 37/0064* (2013.01); *B29C 73/10* (2013.01)

(58) Field of Classification Search
CPC ............ B29C 70/44; B32B 37/10; B30B 5/02
USPC .................. 156/94, 285, 286, 381
See application file for complete search history.

(56) References Cited

U.S. PATENT DOCUMENTS

| | | | |
|---|---|---|---|
| 4,367,108 A * | 1/1983 | Valimont et al. ............. | 156/104 |
| 4,608,220 A * | 8/1986 | Caldwell ................ | A43B 17/14 |
| | | | 264/258 |
| 5,925,297 A | 7/1999 | Noto | |
| 5,958,166 A | 9/1999 | Walters et al. | |
| 6,206,067 B1 | 3/2001 | Kociemba et al. | |
| 6,355,203 B1 | 3/2002 | Charmes et al. | |
| 2003/0188821 A1 | 10/2003 | Keller | |

(Continued)

FOREIGN PATENT DOCUMENTS

| | | |
|---|---|---|
| DE | 4019744 A1 | 1/1992 |
| DE | 102004062064 A1 | 7/2006 |
| DE | 102008051380 A1 | 4/2010 |

OTHER PUBLICATIONS

Canadian Office Action for related Canadian Application No. 02,822,340, dated Oct. 8, 2013.

(Continued)

*Primary Examiner* — Christopher T Schatz
(74) *Attorney, Agent, or Firm* — James E. Walton

(57) ABSTRACT

An apparatus and method for repairing a damaged laminate including the process of cutting out a damaged section and replacing damaged section with a repair laminate, then covering the repair laminate with a vacuum bag having a heater disposed therein. Thereafter, applying heat and pressure to the repair laminate with the heater and vacuum bag to adequately debulk and cure the repair laminate.

12 Claims, 5 Drawing Sheets

(56) References Cited

U.S. PATENT DOCUMENTS

2006/0191624 A1    8/2006   Whitworth et al.
2008/0191378 A1    8/2008   Paul
2008/0283172 A1   11/2008   Bernus et al.
2010/0258235 A1   10/2010   Whitworth et al.

OTHER PUBLICATIONS

Extended European Search Report for related European Application No. 11855604.2, dated Oct. 11, 2013.
Office Action dated Aug. 11, 2014 from counterpart CA App. No. 2,822,340.
EP Office Action dated Apr. 10, 2014 from counterpart EP App. No. 11855604.2.
International Search Report and the Written Opinion of the International Searching Authority mailed by ISA/USA, U.S. Patent and Trademark Office dated Mar. 7, 2011 for International Patent Application No. PCT/US11/20771, 9 pages.
Office Action dated Oct. 14, 2014 from counterpart EP App. No. 11855604.2.
Summons to Attend Oral Proceedings dated Jun. 30, 2015 from counterpart EP App. No. 11855604.2.

\* cited by examiner

SINGLE STAGE DEBULK AND CURE OF A PREPREG MATERIAL

TECHNICAL FIELD

The present invention relates generally to laminates, and more particularly, to a method for repairing a damaged area of a laminate.

DESCRIPTION OF THE PRIOR ART

Laminates are materials typically made from two or more constituent materials with different physical or chemical properties and are utilized in automotive, aeronautical, and marine vehicles, as well as components in many other types of equipment and structures. Laminates will inevitably become damaged over time, thus requiring a worker to either repair the damaged area or replace the entire laminate. It is often required or at least more cost effective to repair the damaged area than to replace the entire laminate.

Conventional repair methods utilize specialized tooling and double vacuum tool/processes, requiring multiple staging operations and cure cycles, or specialized lay-up tools and autoclave processing, which is expensive and often impractical when used to facilitate a repair. Conventional methods generally include two repair stages, the first stage including the process of debulking the laminate, and the second stage including the process of curing the laminate.

Conventional methods also include the process of removing the repair laminate to apply an adhesive thereto prior to the curing process. This process is time consuming and in some cases, problems arise when the worker mistakenly misaligns the repair laminate when reattaching the repair laminate to the damaged laminate.

Although the foregoing developments represent great strides in the area of repairing damaged laminates, many shortcomings remain.

BRIEF DESCRIPTION OF THE DRAWINGS

The novel features believed characteristic of the application are set forth in the appended claims. However, the application itself, as well as a preferred mode of use, and further objectives and advantages thereof, will best be understood with reference to the following detailed description when read in conjunction with the accompanying drawings, wherein:

Figure 1:
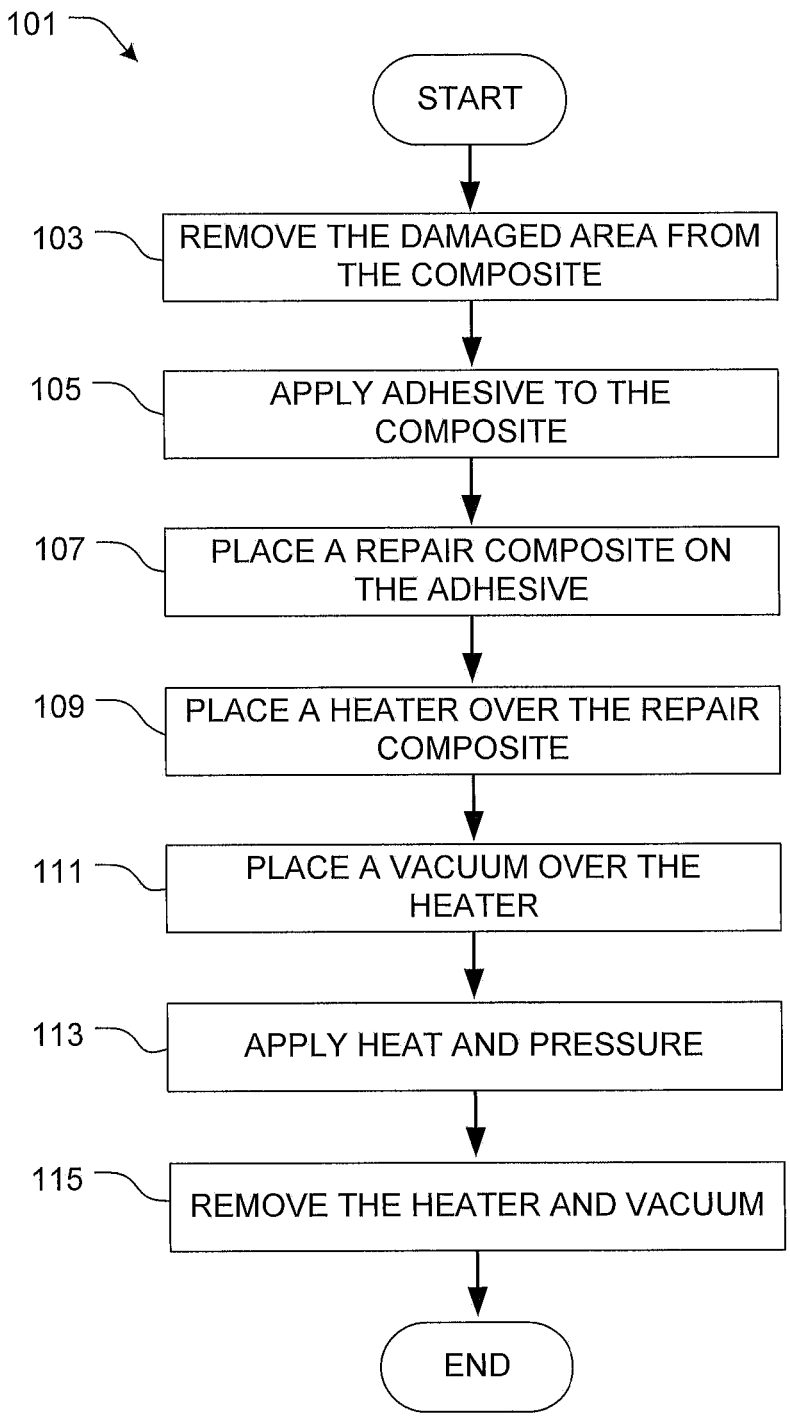
FIG. 1 is a flow chart depicting a method for repairing a damaged laminate according to the preferred embodiment of the present application.
Figure 2:
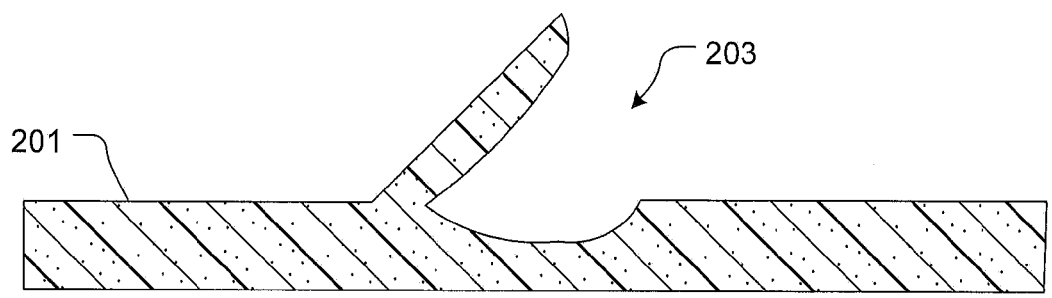
FIG. 2 is a cross-sectional side view of a damaged laminate.
Figure 3:
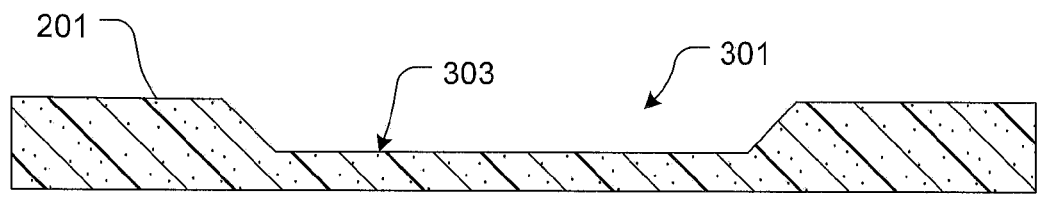
FIG. 3 is a cross-sectional side view of the damaged laminate of FIG. 1 with a recessed area.

While the apparatus and method of the present application is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as described herein.

DESCRIPTION OF THE PREFERRED EMBODIMENT

The apparatus and method of the present application overcomes common disadvantages associated with conventional methods of repairing damaged areas of a laminate. Specifically, the preferred apparatus and method saves significant time and cost by debulking and curing the repair laminate in a single stage. The preferred method eliminates the additional steps of removing the repair laminate to apply an adhesive prior to the curing process.

The apparatus and method of the present application will be understood from the accompanying drawings, taken in conjunction with the accompanying description. It should be understood that various features of the different embodiments may be combined together and/or interchanged with one another, all of which are within the scope of the present application, even though not all variations and particular embodiments may be specifically illustrated or referenced in each figure.

Referring now to FIG. 1 in the drawings, a flow chart 101 shows a method for repairing a laminate according to the preferred embodiment of the present application. Laminates are inevitably damaged over time, thereby requiring the worker to either replaced the damaged area of laminate or to replace the entire laminate. Replacing the entire laminate is time consuming and expensive. Thus, the preferred method includes the process of repairing the damaged area in lieu of replacing the whole laminate. Although the preferred method is utilized for repairing damaged laminates, the preferred method could easily be utilized during the process of fabricating a new laminate.

It should be appreciated that the preferred method can easily be performed within the workshop or in-situ. For example, the various components associated with the apparatus and method for repairing the laminate could easily be carried to the vehicle having a damaged laminate, i.e., a surface panel of an aircraft. In addition, the preferred method could be performed while the damaged laminate is either detached or attached from the vehicle. Although the apparatus and method is shown repairing a damaged laminate having a linear profile, it should be appreciated that the apparatus and method is readily adaptable for use with damaged laminates having different geometric profiles, including circular, concave, and convex profiles.

The first step of the preferred method includes the process of preparing the damaged laminate for receiving a repair laminate. Block 103 represents the process of removing the damaged area from the laminate by any conventional means, including, sawing, drilling, routing, and other similar means. The removed damaged area forms a recessed area within the laminate, which is further treated with an abrasive tool, i.e., a sander, prior to applying an adhesive, as represented in block 105. The recessed surface is now ready for receiving a repair laminate. A repair laminate is prepared and placed on the adhesive, as represented in block 107. The next steps include placing a heater and a vacuum bag over the repair laminate, as represented in respective block 109 and block 111. The vacuum bag is adapted to create an airtight seal around the repair laminate for exerting a negative pressure against the repair laminate. Thereafter, the worker applies heat and pressure to the repair laminate, which in turn debulks and cures the repair laminate while attached to the damaged laminate, as represented in block 113. During this process, the worker adjusts the temperature and pressure applied. A predetermined time passes before the worker removes the vacuum bag and heater from the laminate, as represented in block 115.

Figure 5:
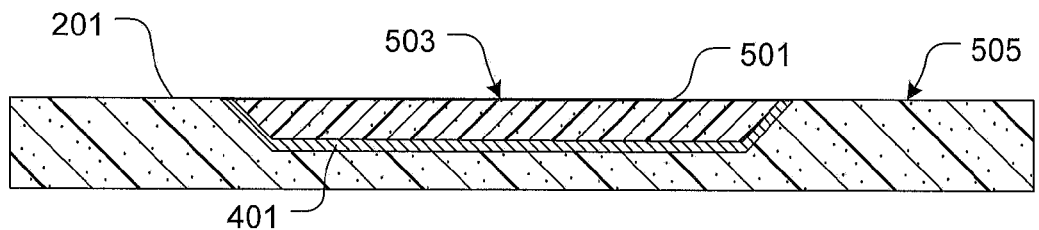
FIG. 5 is a cross-sectional side view of the damaged laminate of FIG. 1 with a repair laminate placed within the recessed area.
Figure 6:
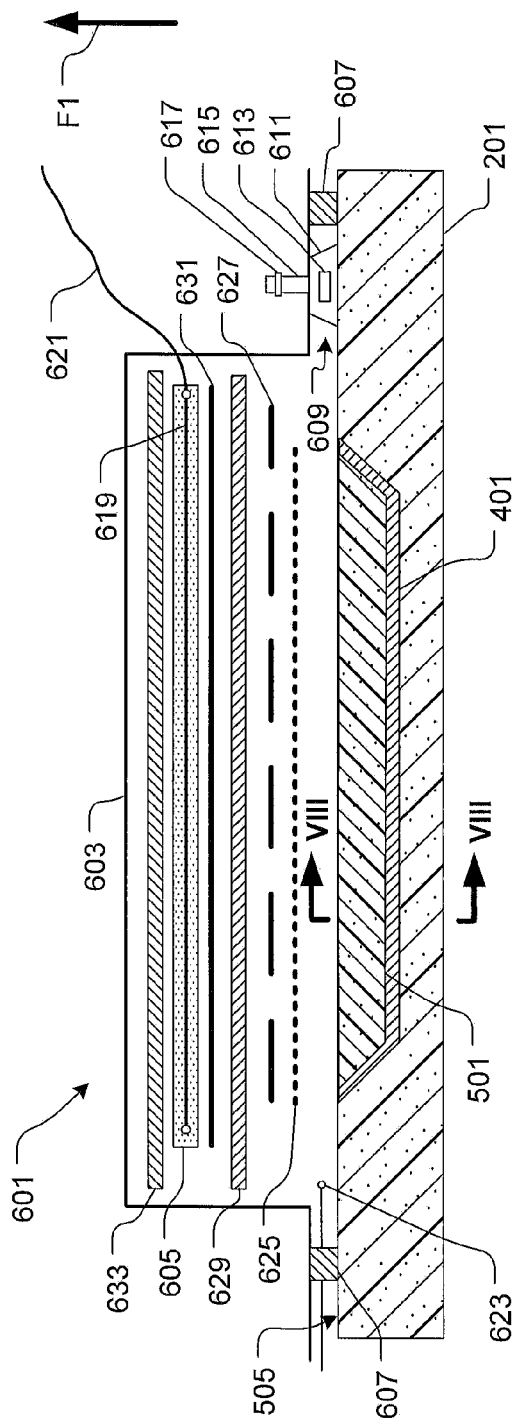
FIG. 6 is a cross-sectional side view of the damaged laminate of FIG. 5 with a heating and pressure apparatus placed over the repair laminate.
Figure 7:
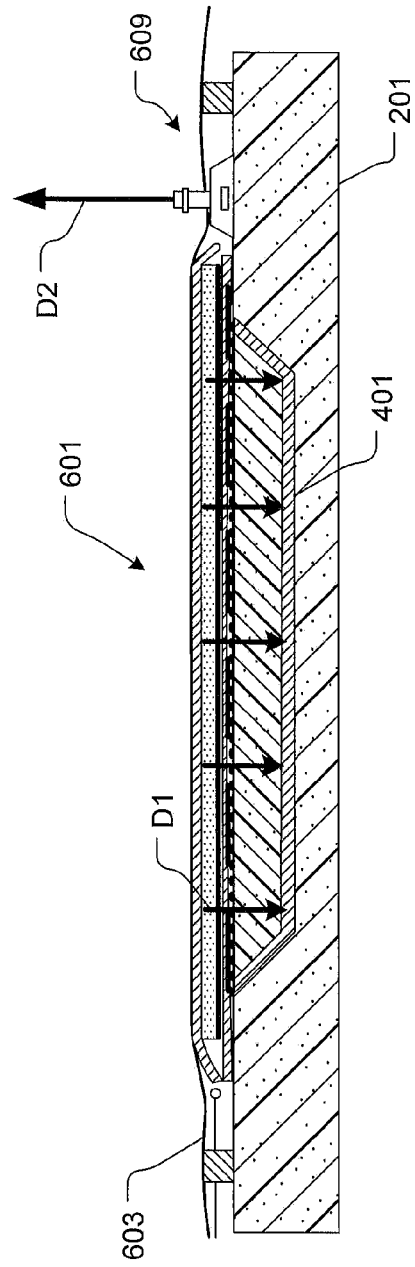
FIG. 7 is a cross-sectional side view of the damaged laminate of FIG. 6 shown during the debulking and heating process of the preferred method.
Figure 9:
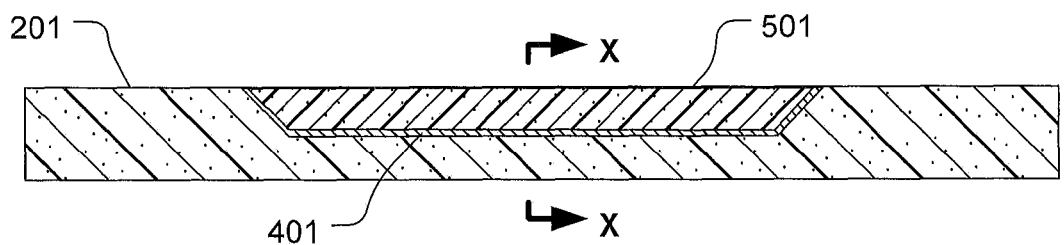
FIG. 9 is a cross-sectional side view of the damaged laminate of FIG. 5 after being repaired according to the preferred method.

FIGS. 2-6 in the drawings illustrate the damaged laminate being prepared for the debulking and curing process; while FIG. 7 shows the debulking and curing process, where heat and pressure are applied to the laminate; and, FIG. 9 shows the debulked and cured laminate.

Figure 4:
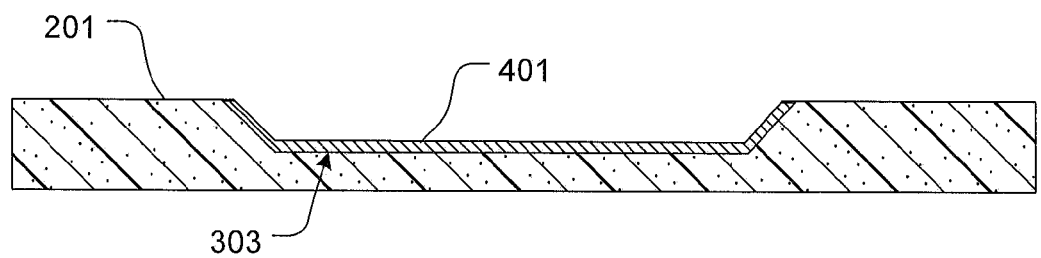
FIG. 4 is a cross-sectional side view of the damaged laminate of FIG. 1 with an adhesive applied to the recessed area.

Referring now to FIGS. 2-5 in the drawings, four different cross-sectional side views of a damaged laminate 201 are shown at different stages during the preparation process. Laminate 201 includes a damaged area 203, which is repaired according to the preferred method of the present application. In the preferred method, a worker prepares laminate 201 by removing damaged area 203, which in turn forms a recessed area 301 for receiving a repair laminate 501. A working surface 303 of recess 301 is then preferably treated, i.e., sandpapered, in preparation for receiving an adhesive. FIG. 4 shows the next step after surface 303 is treated, namely, applying a layer of adhesive 401 to the contoured surface. In the preferred embodiment, adhesive 401 is a layer of FM300 film adhesive; however, it should be appreciated that alternative embodiments could include other forms of adhesives in lieu of the preferred FM300 film adhesive. Finally, the worker prepares repair laminate 501 to match the contouring of surface 303 and places repair laminate 501 on adhesive 401.

FIG. 5 shows a top surface 503 of repair laminate 501 being flush with a top surface 505 of laminate 201. It should be noted that top surface 503 can be slightly offset from surface 505 to compensate for compaction of repair laminate 501 during the debulking and heating stages of the preferred method for repair. In addition, additional surface treatment, i.e., sandpapering, can be performed on the repaired laminate such that surface 503 will be flush with surface 505.

Referring now to FIG. 6 in the drawings, a cross-sectional side view of laminate 201 is shown with a repair apparatus 601. Apparatus 601 is placed on surface 503 of repair laminate 501 and surface 505 of laminate 201 and utilized for applying heat and pressure during the debulking and curing stage. It should be appreciated that apparatus 601 is portable, thus easily and readily adaptable for use in the field. Apparatus 601 includes a vacuum bag 603 and a heater 605 for providing adequate heat and pressure to debulk and cure repair laminate 501.

In the preferred embodiment, vacuum bag 603 is composed of a non-porous plastic material sufficiently durable for exerting a negative pressure force on repair laminate 501 such that gases formed within the laminate are extracted in a direction D1. Vacuum bag 603 is securely fastened to surface 505 via an attachment device 607. Attachment device 607 allows vacuum bag 603 to create a substantially airtight fit between surface 505 and vacuum bag 603. In the preferred embodiment, attachment device 607 is an adhesive tape; however, it should be appreciated that alternative embodiments could include different types of attachment devices, i.e., putty, magnets, other forms of adhesives, clips, clamps, quick-release devices, and other suitable devices in lieu of the preferred embodiment.

Apparatus 601 is further provided with a vacuum valve 609 for evacuating air and gases trapped within the sealed area of vacuum bag 603. Valve 609 includes a base portion 611 adapted to abut against surface 505, a port 613 extending through a side surface of base 611, and a conduit 615 attached to a top surface of base 611 and adapted to extend through vacuum bag 603. An inner conduit (not shown) is disposed within base 611 and is in fluid communication with both port 613 and conduit 615. The inner conduit allows fluid and gas passage from the sealed area of vacuum bag 603 to a vacuum assembly (not shown). Valve 609 is further provided with a quick-release device 617 adapted to lock with a locking device operably associated with the vacuum assembly. During operation, the worker attaches a hose to conduit 615 and then activates the vacuum assembly, which in turn evacuates the air, gases, and resin froth trapped within the sealed area of vacuum bag 603.

Heater 605 provides adequate heat to debulk and cure repair laminate 501 and is preferably composed of a blanket having one or more electrical wires 619 disposed therein. Heater 605 is further provided with a connector 621 conductively coupled to wires 619 and coupled to an external power source (not shown). During operation, the worker regulates the heat applied to repair laminate 501 with one or more controls operably associated with the power source, thus providing the desired amount of heat during the curing and debulking process. It should be appreciated that alternative embodiments could include different types of heaters in lieu of the preferred embodiment. For example, a heater chemically activated or a heater having one or more fluid coils could be used in lieu of the preferred embodiment.

In the preferred embodiment, the amount of heat and pressure applied is manually regulated; however, it should be appreciated that alternative embodiments could include one or more control systems for autonomously controlling the amount of heat and pressures applied. Apparatus 601 is further provided with a thermocouple 623 for measuring the temperature of heat applied to repair laminate 501. During operation, the worker carefully monitors the temperature readings from thermocouple 623 for adjusting the electrical power to wires 619.

The dual process of applying heat and pressure to repair laminate 501 allows the curing and debulking process to be performed in a single stage. The preferred method reduces the time and effort exhausted in repairing the damaged laminate. In particular, the preferred method eliminates the time consuming process of debulking the repair laminate, removing the debulked repair laminate, removing the heat and pressures apparatus, applying an adhesive to the recessed area, reattaching the repair laminate to the recessed area, reattaching the heat and pressure apparatus, and curing the repair laminate. In the preferred embodiment, the worker is able to apply the adhesive prior to attaching the repair laminate because both debulk and cure processes are performed in a single stage.

Apparatus 601 further includes one or more additional layers of material for creating a uniform heat and pressure distribution and for allowing easy removal of apparatus 601 from surface 505. Apparatus 601 comprises one or more of a porous material 625; a porous release film 627; fiberglass material 629; a release film 631, and a breather material 633.

Material 625 is preferably applied directly to surface 503 of repair laminate 501 and is composed of a fine porous Teflon® coated fiberglass material. The porous Teflon® material is adapted to aerate repair laminate 501 during the debulking and curing stage, thus allowing the vacuum pressure to extract gases from repair laminate 501. Release film 627 is placed on material 625 and is preferably composed of coarse porous material having one or more perforated 2 inch diameter centers. In the preferred embodiment, both material 625 and release film 627 are utilized; however, it should be appreciated that alternative embodiments could include a single release film having a sufficient porosity for aerating repair laminate 501 during the debulking and curing stage.

Material 629 is placed over both material 625 and release film 627 and is preferably composed of a fiberglass material for providing sufficient bleeding of froth resign and gases extracted from repair laminate 501. Material 629 does not compress during the debulking and curing stage, thus allowing a vacuum path for bleeding resin froth and gases from repair laminate 501. Heater 605 is positioned over material 629 and release film 631 is disposed therebetween for allowing easily detachment of heater 605 from material 629. Breather material 633 is finally placed over heater 605 and is preferably composed of a porous cloth or similar material for providing passage of gases and air trapped within the sealed area of vacuum bag 603.

The debulking and curing process includes the steps of first applying a vacuum pressure to start the process of removing gases from repair laminate 501. After a predetermined time, heat is applied and gradually increased over time. Upon reaching a desired temperature, the pressure and heat are maintained for a predetermined length of time. Additional temperature and pressure are applied to adequately cure repair laminate 501. It should be understood that the pressure, temperature, and time durations are adapted specifically for the type of laminate material and resin within the laminate.

In the preferred embodiment, vacuum pressure is initially set at 2 inches of mercury and gradually increased to 5 inches of mercury during a 60 minute time period. Upon reaching 3 inches of mercury, heat is applied at about 75 degrees Fahrenheit and increased at a rate of approximately 5 degrees Fahrenheit per minute. At 225 degrees Fahrenheit, the pressure and heat is held constant for approximately 60 minutes, resulting in the gases leaving repair laminate 501. Subsequently, the vacuum pressure is increased to about 28 inches mercury and heat is gradually increased to around 3 degrees Fahrenheit per minute until reaching 350 degrees Fahrenheit. The temperature and pressure are held until repair laminate 501 is fully cured.

Referring now to FIG. 7 in the drawings, a cross-sectional side view of apparatus 601 and laminate 201 are shown. FIG. 7 depicts apparatus 601 applying heat and pressure to laminate 201, as shown with the arrows traveling in direction D2. During operation, the worker connects a hose or other suitable device to valve 609, then evacuates air and gases from within the sealed volume of vacuum bag 603 with an external vacuum assembly in fluid communication with valve 609, which in turn causes the entrapped gases and air to evacuate, as indicated by arrow D3. After sufficient negative pressure is applied, the worker adds heat with heater 605. The combination of applying heat and pressure causes sufficient debulking and curing of repair laminate 501.

Figure 8:
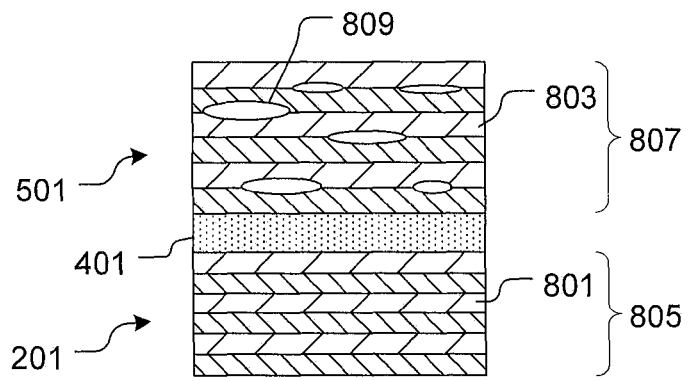
FIG. 8 is a cross-sectional front view of the damaged laminate of FIG. 6 taken at VIII-VIII.

Referring now to FIG. 8 in the drawings, a cross-sectional front view of laminate 201 and repair laminate 501 are shown during to application of heat and pressure. Both laminate 201 and repair laminate 501 are composed of two or more respective plies 801 and plies 803, which in turn form respective ply stack 805 and ply stack 807. It should be understood that plies 801 are "wet lay-up" plies or pre-impregnated, i.e., "pre-preg" plies and have not been cured. In addition, ply stack 805 and ply stack 807 may comprise any suitable number of plies. During the debulking and curing stage, repair laminate 501 will form a plurality of gas pockets 809 from the resin disposed within stack 807. During debulking, gas pockets 809 travel through stack 807 and are trapped within the sealed area of vacuum bag 603. Gas pockets 809 mitigate in size and in most cases completely disappear after the debulking process (see FIG. 10).

Figure 10:
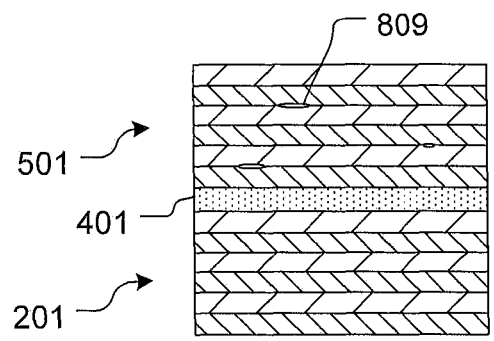
FIG. 10 is a cross-sectional front view of the damaged laminate of FIG. 9 taken at X-X.

Referring now to FIGS. 9 and 10 in the drawings, cross-sectional views of laminate 201 and repair laminate 501 are shown after the repairing process. FIG. 10 is a cross-sectional view of laminate 201 taken at X-X of FIG. 10. After the debulking and curing stage, repair laminate 501 is securely attached to laminate 201 with adhesive 401. In addition, gas pockets 701 have been either mitigated in size or eliminated due to the pressure and temperature applied by apparatus 601.

Figure 11:
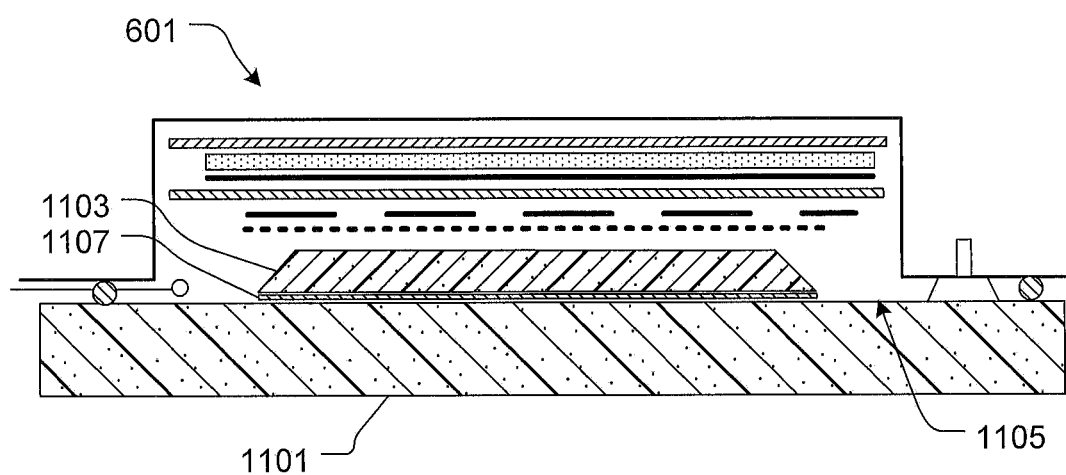
FIG. 11 is a cross-sectional front view of an alternative method for repairing the damaged laminate.

Referring now to FIG. 11 in the drawings, an alternative embodiment of the method for repairing a laminate is shown. It should be understood that the preferred method of repairing a laminate is easily adapted for use with laminates having the repair laminate stacked above the damaged laminate. For example, FIG. 11 shows a damaged laminate 1101 being repaired with a repair laminate 1103 placed on a top surface 1105 and an adhesive 1107 disposed therebetween. Laminate 1101 is repaired according to the preferred process, wherein apparatus 601 applies heat and pressure to repair laminate 1103, which in turn debulks and cures repair laminate 501 to laminate 1101.

It is evident by the foregoing description that the method for repairing a damaged laminate has significant benefits and advantages over conventional repair methods. In particular, the preferred method includes the step of placing an adhesive to the recessed area prior to debulking and curing the repair laminate, which allows the worker to debulk and cure the laminate in a single stage, which in turn saves time and money. In addition, the single stage debulk and cure process eliminates the step of reattaching the repair laminate, which can cause the repair laminate to become misaligned within recessed area.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. An apparatus for debulking and co-bonding a repair laminate attached to a damaged laminate, the apparatus comprising:
   a porous material positioned directly on the repair laminate;
   a perforated release film placed on the porous material;
   a fiberglass material positioned above the porous material, the fiberglass material being configured to provide sufficient bleeding of froth resign and gases;
   a heater blanket positioned above the fiberglass material, the heater blanket having:
      a layer of pliable heat absorbing material, the layer of pliable heat absorbing material being configured to conform to a contour of the damaged laminate placed thereon; and
      a wire disposed within the pliable heat absorbing material, the wire being electrically coupled to an external electrical power source;
      wherein electrical power from the external electrical power source passes through the wire, which in turn creates heat that passes through the pliable heat absorbing material; a vacuum bag attached to a surface of the damaged laminate, the vacuum bag forming an airtight cavity, the airtight cavity being adapted to receive the heater blanket therein; and a vacuum valve in gaseous communication with the airtight cavity, the valve being configured to provide access to a gas trapped within the airtight cavity during an excavation process; wherein the fiberglass material is non-compressible; wherein a porosity of the perforated release film is coarse and a porosity of the porous material is fine; wherein an amount of the electrical power passing through the wire of the heater blanket is adjusted to provide sufficient heat; and
   wherein an amount of suction pressure to the vacuum bag is adjusted to create a negative pressure on the repair laminate while debulking and co-bonding the repair laminate.

2. The apparatus according to claim 1, wherein a breather material bleeds gases from a gas pocket disposed within the repair laminate while debulking and co-bonding the repair laminate.

3. The apparatus according to claim 2, further comprising:
   a release film placed between the heater blanket and the fiberglass material.

4. The apparatus according to claim 1, further comprising:
   an attachment device for securing the vacuum bag to the surface of the damaged laminate.

5. The apparatus according to claim 4, wherein the attachment device is an adhesive tape.

6. The apparatus according to claim 1, further comprising:
   a thermocouple positioned within the airtight cavity.

7. An apparatus for debulking and co-bonding a repair laminate for a damaged laminate, the apparatus comprising:
   a bleeder material placed on a surface of the repair laminate;
   a perforated release film placed on the bleeder material;
   a fiberglass material placed on the bleeder material, the fiberglass material being configured to provide sufficient bleeding of froth resign and gases;
   a heater blanket positioned on the fiberglass material, the heater blanket having:
      a layer of pliable heat absorbing material, the layer of pliable heat absorbing material being configured to conform to a contour of the damaged laminate placed thereon; and
      a wire disposed within the pliable heat absorbing material, the wire being electrically coupled to an external electrical power source;
      wherein electrical power from the external electrical power source passes through the wire, which in turn creates heat that passes through the pliable heat absorbing material;
   a breather material positioned on the heater blanket;
   a vacuum bag attached to a surface of the damaged laminate, the vacuum bag forming an airtight cavity, the airtight cavity adapted to receive the bleeder material, the heater blanket, the fiberglass material, and the breather material; and
   a vacuum valve in gaseous communication with the airtight cavity, the valve being configured to provide access to a gas trapped within the airtight cavity during the an excavation process; wherein the fiberglass material is non-compressible; wherein a porosity of the perforated release film is coarse and a porosity of the porous material is fine; and wherein during the debulking and co-bonding of the repair laminate, the heater blanket creates heat and the vacuum bag exerts negative pressure on the repair laminate, the breather material provides gas passage within the airtight cavity, and the bleeder material bleeds gases from a gas pocket disposed within the repair laminate.

8. The apparatus according to claim 7, further comprising:
   an attachment device for securing the vacuum bag to the surface of the damaged laminate.

9. The apparatus according to claim 8, wherein the attachment device is an adhesive tape.

10. The apparatus according to claim 7, further comprising:
    a thermocouple positioned within the airtight cavity.

11. The apparatus according to claim 1, wherein the perforated release film is comprised of a plurality of holes each having a diameter of 2 inches.

12. The apparatus according to claim 7, wherein the perforated release film is comprised of a plurality of holes each having a diameter of 2 inches.

* * * * *